Jan. 12, 1943.　　　A. L. JOHNSON　　　2,308,082
TRANSMISSION
Filed Jan. 23, 1940　　　3 Sheets-Sheet 1

INVENTOR
Albert L. Johnson
BY
ATTORNEY

Jan. 12, 1943.　　　A. L. JOHNSON　　　2,308,082
TRANSMISSION
Filed Jan. 23, 1940　　　3 Sheets-Sheet 2
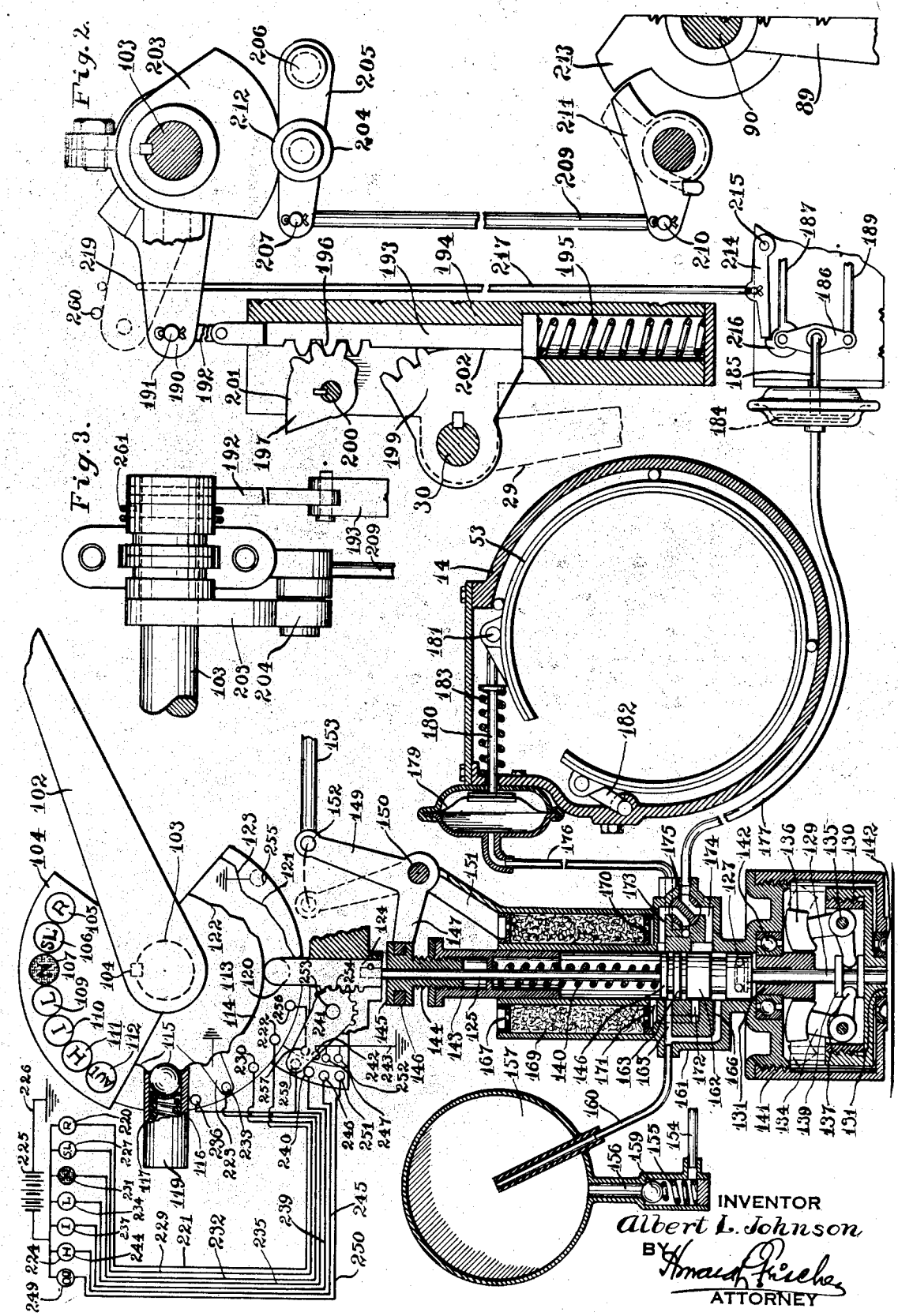
INVENTOR
Albert L. Johnson
BY
ATTORNEY Jan. 12, 1943.    A. L. JOHNSON    2,308,082
TRANSMISSION
Filed Jan. 23, 1940    3 Sheets-Sheet 3
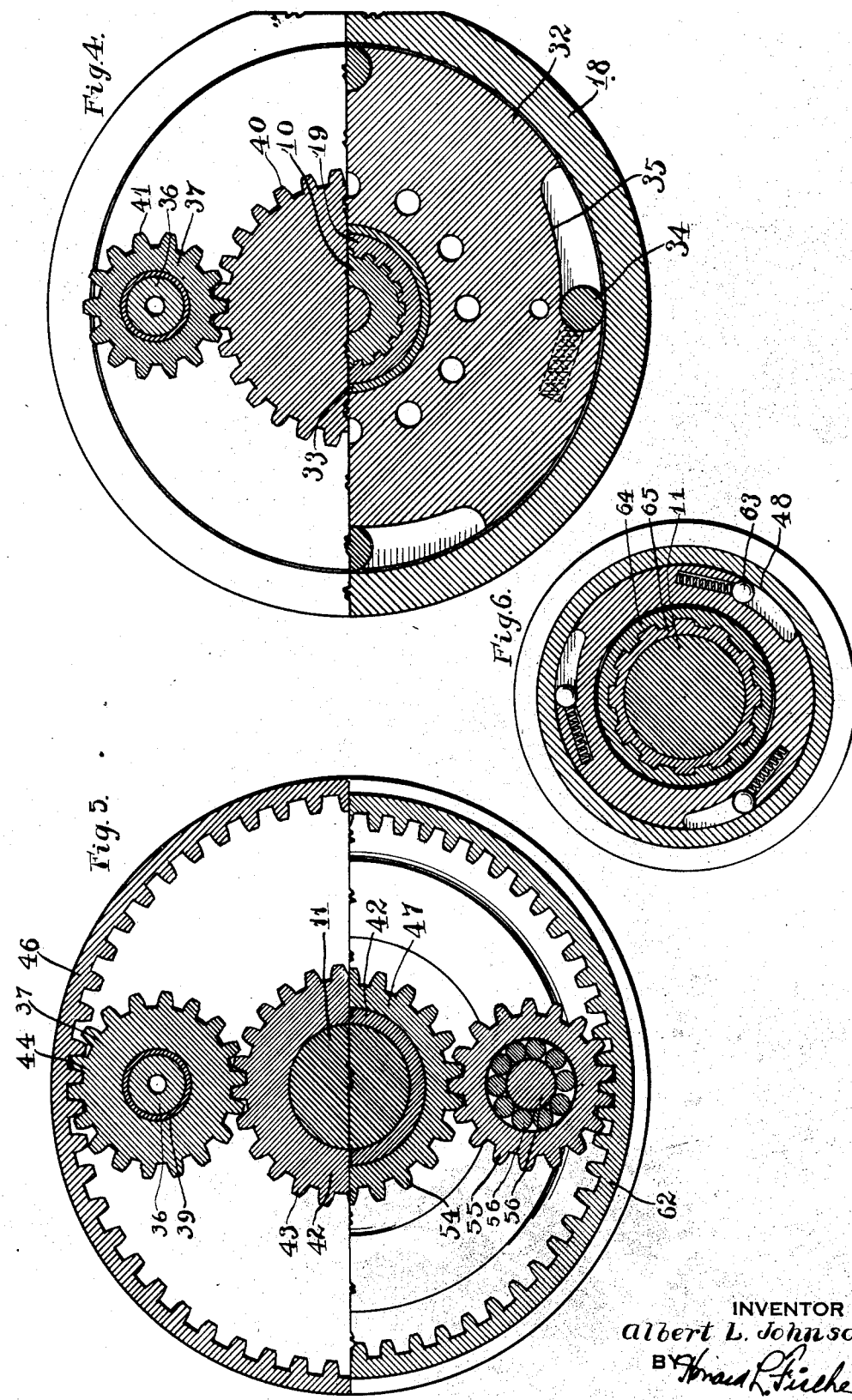
INVENTOR
Albert L. Johnson
BY
ATTORNEY Patented Jan. 12, 1943

2,308,082

UNITED STATES PATENT OFFICE 2,308,082

TRANSMISSION

Albert L. Johnson, White Bear Lake, Minn., assignor to Johnson Power-On Transmission Corporation, St. Paul, Minn., a corporation of Minnesota Application January 23, 1940, Serial No. 315,216

15 Claims. (Cl. 74—276)

My invention relates to an improvement in transmissions wherein it is desired to provide a small compact transmission capable of driving a driven shaft at various speeds relative to a drive shaft.

Numerous types of transmissions have been previously constructed, some of which are automatically operable to vary the speed ratio between the drive shaft and the driven shaft. Many transmissions have been constructed in which the gears are constantly in mesh. Most of these constructions, however, have been extremely bulky and complex. It is a purpose of the present invention to provide a small compact gear unit employing an extremely small number of gears, but which is capable of driving a driven shaft at a large number of speeds relative to the drive shaft without shifting any of the gears into or out of relation with others of the gears.

It is an object of my invention to provide a transmission which is capable of driving a driven shaft in a forward or reverse direction without shifting any of the various drive gears. This I accomplish by providing related epicyclic gear systems, by holding the supporting means for certain of the intermediate drive pinions of such systems stationary with respect to the rotary casing enclosing the transmission, and by properly proportioning the gears, rotation of the drive shaft causing the gears to produce a reverse rotation of the driven shaft.

It is a feature of my invention to provide a gear casing which is rotatable with a driven shaft and to mount within this casing a pair of epicyclic gear systems including intermediate and ring gears annularly arranged about sun gears rotatable about the driven shaft. Various supports are provided for the gears within the casing, and the gear ratios between the drive and driven shafts are changed by selectively holding the sun gears stationary and by causing certain of the intermediate gear supports to rotate in unison with other rotary parts. By means of this combination of annularly arranged gears, it is possible to provide a means of reversing the driven gear with respect to the drive gear and for producing a series of forward speeds.

It is a further object of my invention to provide a transmission including a pair of epicyclic gear systems, a housing for said systems rotatable with a drive shaft and to provide gear supports within the standard which are connected to external drums. Brake bands are provided encircling these external drums so that by proper manipulation of the brake bands, various forward and reverse speeds may be attained by the driven shaft with respect to the drive shaft. Means are also provided to engage certain of the gear supports fixedly to the driven shaft so that the gears and their support may rotate as a unit with this driven shaft.

It is a further object of my invention to provide a vacuum control by means of which my transmission may be operated. Through the use of this control, the transmission may be readily operated into any desired speed ratio without requiring manipulation of gears or gear supports by a hand operated shifting lever or the like.

It is a further feature of my invention to provide a transmission embodying a rotary casing and employing rotary drums which may be held from rotation by suitable brake means. These drums are so devised and positioned that relatively small braking force is required to hold the same during rotation of the drive shaft in order to produce the desired speed ratio upon the driven shaft.

It is a further feature of my invention to provide a transmission formed with a pair of epicyclic gear systems, in which none of the gears travel at a high rate of speed. My transmission is so arranged that the planet or intermediate gears of the systems rotate about the sun gear in the same direction in which the sun gear is travelling, and that the ring gears travel in the direction of rotation of the sun gear. Thus the relative speed of rotation between the various gears in the systems is low.

These and other objects and novel features of my invention will be more clearly and fully set forth in the following specification and claims.

In the drawings forming a part of my specification:

Figure 2 is a diagrammatic view of a control system which may be utilized to actuate the various controls of my transmission.

Figure 3 is an end elevation view of a portion of the clutch actuating mechanism illustrated in Figure 2 of the drawings.

Figure 4 is a section on the line 4—4 of Figure 1.

Figure 5 is a section on the line 5—5 of Figure 1.

Figure 6 is a section on the line 6—6 of Figure 1.

Figure 1:
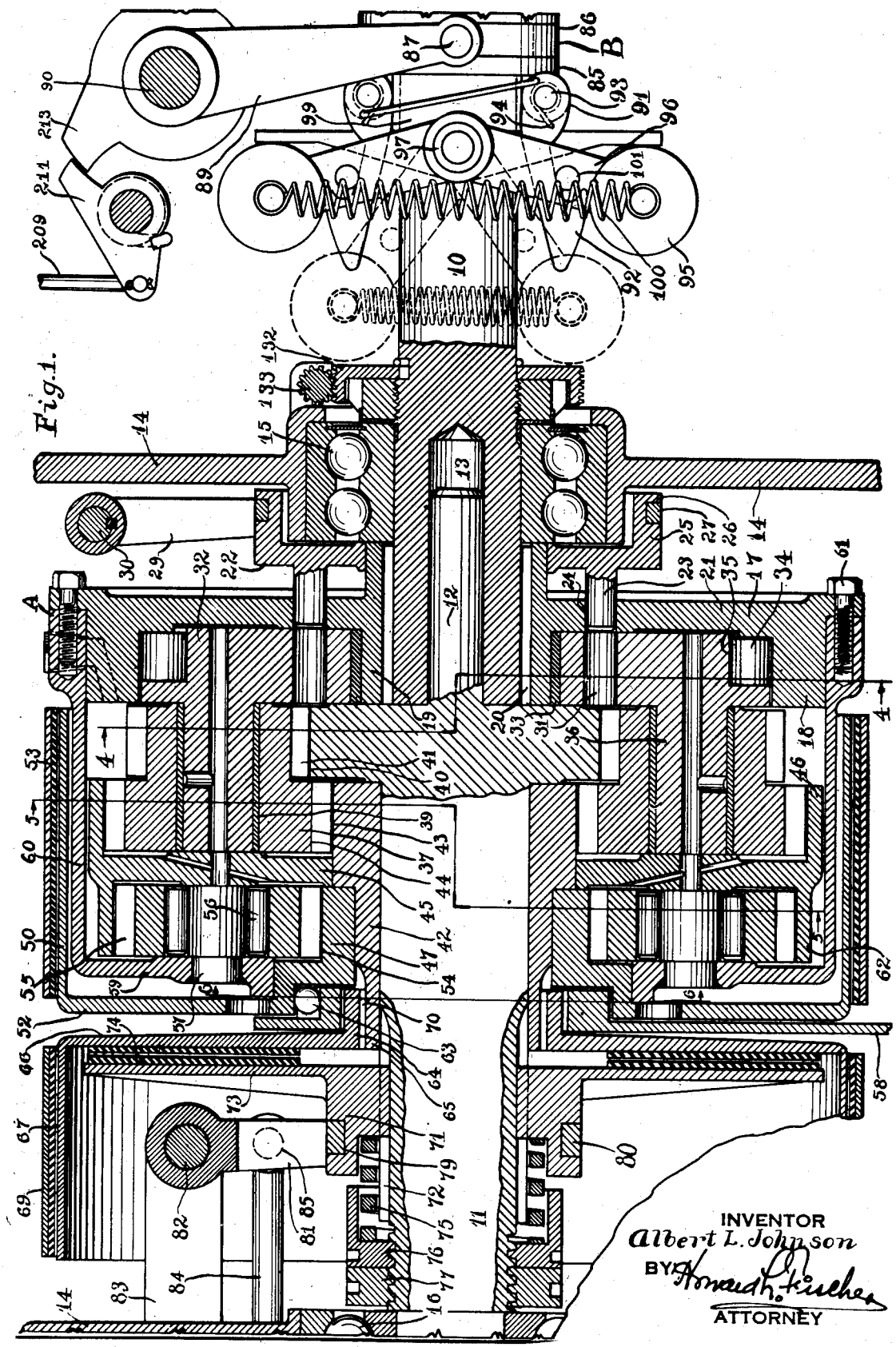
Figure 1 is a longitudinal cross-sectional view vertically through the center of my transmission.

The transmission A includes a drive shaft 10, connected to a suitable clutch unit B, and a driven shaft 11 arranged concentrically with respect to the shaft 10. The shaft 11 is provided with an extension 12 of small diameter relative to the shaft 10 which engages within an axial recess 13 in the shaft 10 to hold the shafts 10 and 11 in proper alignment.

The transmission A is provided with a suitable outer casing 14 only partially disclosed in the drawings, which may be of any preferred shape. A bearing 15 is mounted at one end of the housing 14 to support the shaft 10 while a bearing 16 is mounted at the other end of the housing 14 to provide a bearing for the driven shaft 11.

Within the housing 14 I provide a rotatable casing 17. This casing 17 is provided with a hub 19 secured to the drive shaft 10 by spline 20 or by a keyed connection at the end of the shaft. The casing 17 includes the end plate 21 which is equipped with a circular flange 18 near its outer extremity. A collar 22 encircles the hub 19 and is provided with angularly spaced pins 23 extending through suitable apertures 24 in the disc-shaped end plate 21. The collar 22 is axially slidable with respect to the disc 21 and is provided with a circular peripheral flange 25 having a groove 26 therein to accommodate a shifting collar 27. The collar 27 is pivotally and slidably attached to the rock lever 29 pivotal with the shaft 30. By rocking the shaft 30, the collar 27 and accordingly the entire collar 22 may be moved longitudinally with respect to the rotary casing 17.

The collar 22 is shiftable from the position indicated in Figure 1 of the drawings to a position in which the pins 23 extend into suitable recesses 31 in a gear supporting carrier 32. This gear supporting carrier 32 encircles the hub 19 of the casing 17 and is supported upon a bearing 33 around the hub 19. When the pins 24 are slidably engaged into the apertures 31 in the gear support 32, this gear support must rotate in unison with the casing 17.

A series of overrunning clutch rollers 34 are recessed in cam slots 35 in the outer periphery of the gear support 32. These rollers are spring urged, and permit the rotation of the gear support 32 in one direction only with respect to the casing 17. The clutch rollers carry the gear support 32 in the direction of rotation of the drive shaft, insuring that the gear support will travel at least as fast as the drive shaft. Stub shafts 36 are formed upon the disc-shaped gear support 32 to provide an axis for double gears 37. Bushings 39 are interposed between the supports 36 and the gears 37 over which the gears 37 rotate. The disc 32 thus forms a bracket to support the intermediate gears of an epicyclic gear system which will be later described in detail.

The driven shaft 11 is provided with a gear 40 engageable with one set of gear teeth 41 on the double gears 37. The gear 40 is the sun gear of the epicyclic gear system. A sleeve 42 encircles the shaft 11 adjacent the gear 40. This sleeve 42 is provided with gear teeth 43 engageable with the teeth 44 of the other gear of the double gear 37. Encircling the sleeve 42 adjacent the teeth 43, I provide a disc-shaped support 45 supporting the internal gear 46. The gears 44 comprise the intermediate gears of the epicyclic system. The teeth of the internal gear 46 also engage the gears 44.

A second sleeve 47 encircles a smaller diameter portion 49 of the sleeve 42. This sleeve 47 forms a hub for a brake drum 50 connected thereto by means of a disc-shaped flange 52. A brake band 53 encircles the brake drum 50 and provides a means by which the rotation of the sleeve or hub 47 may be stopped. A gear 54 is formed on the hub 47, constituting the sun gear of a second epicyclic system. This sun gear 54 is in constant mesh with a pair of pinions 55 comprising the intermediate gears of the second epicyclic system. The pinions 55 are supported on bearings 56 encircling a stub shaft 57. The shaft 57 is mounted in suitable supporting bearings on the end plate 59 of the rotary casing 17. Thus the casing 17 forms the bracket or arm supporting the intermediate gears 55 of the second epicyclic system. The end plate 59 is connected by a cylindrical portion 60 to the end plate 21 which has been previously described and is secured thereto by suitable bolts 61 or other suitable means.

The pinions 55 are in constant mesh with an internal gear 62 on the disc-shaped support 45 opposite the internal gear 46, completing the second epicyclic system. The internal gear 62 is of slightly smaller diameter than the internal gear 46 and the pinions 55 are of slightly smaller diameter than the gear 44 of the double gear 37. A one-way brake 63 is interposed between a stationary collar 58 fixedly secured to the housing 14 and the large diameter bore portion 48 of the sleeve or hub 47 to prevent rotation of the drum 50 and gear 54 in one direction with respect to the fixed housing 14. The purpose for this construction will be clearly set forth when the operation of the transmission is described.

A hub 64 encircles the small diameter end 65 of the sleeve 42 and is connected by a disc-shaped flange 66 to a brake drum 67. The drum 67 is equipped with a brake band 69 by means of which it may be held stationary. The hub 64 is held from rotation with respect to the sleeve 42 by the spline 70.

A hub 71 is spline connected at 72 to the shaft 11 longitudinally slidable thereupon. A circular flange 73 is connected to the hub 71 and co-operating clutch friction discs 74 are provided upon the flange 73 and the flange 66. The hub 71 and its attached flange 73 are urged into engaging relation with the flange 66 by means of the spring 75. This spring tends to engage the clutch friction discs 74. The tension of the spring 75 is adjusted by means of the nut 76 and lock nut 77, which are threadably engaged upon the shaft 11. The hub 71 is grooved at 79 and a collar 80 is mounted in this groove. The collar 80 is pivotally and slidably attached to the bifurcated operating arm 81 which is pivoted at 82 to a bracket 83 secured to the casing 14. An operating rod 84 is pivoted at 85 to the bifurcated arm or lever 81 to slide the hub 71 and its attached flange 73 longitudinally with respect to the shaft 11. When the rod 84 is pulled to the left, as viewed in Figure 1 of the drawings, the bifurcated arm 81 is swung in a clockwise direction, drawing the collar 80 and the hub 71 to the left along the shaft 11, disengaging the clutch elements 74. Obviously when the clutch elements 74 are engaged, the drum 67, hub 64, and sleeve 42 to which the hub is keyed, rotate with the shaft 11, and therefore the gear 43 also rotates with the shaft 11.

Let us now consider the operation of the transmission to provide different relative rotative speeds and directions between the drive shaft 10 and the driven shaft 11. Say it is desired to provide a reverse direction of the driven shaft 11 with respect to the drive shaft 10. In order to accomplish this result, the operating rod 84 must slide the hub 71 against the tension of the spring 75 to disengage the clutch discs 74. The band 69 is loose upon its drum 67, but the band 53 is tightened about the drum 50, holding this drum 50 from rotation. The pins 23 on the collar 22 are moved into engagement with the apertures 31 on the disc 32, so that the disc rotates in unison with the casing 17. It will now be seen that the sun gear 54 is held stationary while the casing 17 connected to the drive shaft and forming the arm or bracket for the intermediate gears 55 of the second epicyclic gear system rotates about the sun gear 54. This action causes a rotation of the ring gear 62 in the same direction as the casing 17, but at an increased rate of speed with respect thereto. Rotation of the ring gear 62 also causes rotation of the ring gear 46 connected therewith. This ring gear 46 is in constant mesh with the gears 44 of the double gears 37 which also pivot with the casing 17. In other words, the intermediate gears 44 of the first epicyclic system and the intermediate gears 55 of the second epicyclic system both are mounted on the same bracket or upon brackets travelling at the same rate of speed. Thus the difference in speed of rotation between the gears 44 and 55 depends upon their relative difference in diameter. As the ring gear 46 is slightly larger than the ring gear 62, the gear 44 will be rotated in a reverse direction at relatively slow speed. The gear 41 of the double gear 37 rotates with the gear 44 and causes rotation of the driven gear 11. As the gear 41 is smaller than the gear 44, the speed of rotation of the shaft 11 is again reduced. Thus by merely engaging the pins 23 in the apertures 31 to cause rotation of the gear support 32 in unison with the casing 17 and by holding the gear 54 stationary from rotation, the shaft 11 may be rotated in a reverse direction.

When it is desired to provide an extremely low forward speed of the driven shaft 11, the pins 23 are disengaged from the gear support 32, allowing this gear support to rotate with respect to the casing 17. The clutch members 74 remain disengaged, the band 69 remains loose upon its drum 67, and the band 53 is tightened about the drum 50. Rotation of the drive shaft 10 causes rotation of the intermediate gears 55 about the stationary sun gear 54, thus causing rotation of the ring gear 62 in the direction of the drive shaft. The ring gear 46 also rotates with the ring gear 62, causing rotation of the double gears 37. The gear support 32 is rotated by the overrunning clutch rollers 34 at a speed normally equal to the speed of rotation of the casing 17, and the rotation of the gears 37 by the ring gear 46 tends to increase the speed of the gear support 32 with respect to the casing 17. Previously the disc 17 was held at the same speed as the casing by the pins 23, but in this forward speed, the pins 23 have been disengaged from the disc, permitting this disc or gear support to rotate faster than the casing 17. As a result, the gear 40 on the shaft 11 is driven at an extremely low forward speed by the gear 41 of the double gear 37.

When a forward speed is desired which would correspond to the usual low speed of an automobile transmission, the clutch members 74 are held disengaged, the band 69 is tightened about its drum 67 to prevent rotation thereof, the band 53 is loosened with respect to its drum 50 to permit rotation, and the pins 23 are held in retracted position. When this setting is made, the gear 43 on the sleeve 42, comprising the sun gear of the first epicyclic gear system, is held stationary and the intermediate gears 44 are carried about the sun gear by the pawls 35 at a speed equal to the speed of rotation of the casing 17. Rotation of the gears 44 also cause rotation of the gears 41 attached thereto and as has been explained, the gears 41 are in mesh with the gear 40 of the driven shaft 11. As the gears 41 are of smaller diameter than the gears 44, rotation of the double gear 37 causes a slow forward rotation of the driven shaft 11, the relative speed of the shaft 11 with respect to the drive shaft 10 depending upon the difference in ratio between the gears 44 and 41.

When it is desired to rotate the driven shaft 11 at a speed corresponding to the usual intermediate speed of a motor vehicle, both the bands 69 and 53 are tightened about their respective drums 67 and 50, the clutch members 74 remaining disengaged and the pins 23 remaining in retracted position. When both of the bands 69 and 53 are tightened, both of the sun gears 54 and 43 of the second and first epicyclic gear systems are held from rotation. The pivots of the intermediate gears 55 are swung about their axis at a speed corresponding to the speed of the drive shaft, being supported by the casing 17. Rotation of the casing 17 and the gears 55 causes a forward rotation of the ring gear 62 at a speed substantially reduced from the speed of the drive shaft. The ring gear 46 rotates with the ring gear 62. Thus the speed of rotation of the ring gear 46 is fixed, while the gear 43 with which the intermediate gear 44 meshes is held stationary. As the ring gears 46 and 62 are not of the same diameter, and as the intermediate gears 55 and 44 of the two epicyclic systems are not identical, it is obvious that the bracket or support for the intermediate gears 44 must rotate at a speed greater than the speed of rotation of the casing 17. This greater speed of rotation increases the speed of the gear 41, increasing the speed of the driven shaft 11. A speed greater than the aforementioned low speed is thus attained in the driven shaft 11.

When it is desired to drive the shaft 11 at a speed corresponding to the usual high speed of a motor vehicle, bands 69 and 53 are both released from their respective drums 67 and 50, and immediately thereafter, the clutch members 74 are engaged by releasing the tension on the rod 84 tending to hold the hub out of engagement with the disc 66 against the tension of the spring 75. When tension on the rod 84 is released, the spring 75 urges the clutch members 74 into engagement. When this action takes place, the sleeve 42 is directly connected to the driven shaft 11, as the sleeve 42 rotates together with the disc 66 connected by the clutch member 74 to the flange 73 of the hub 71 which is keyed to the shaft 11. As the gears 43 and 40 are now locked against the relative rotation and as the gears 44 and 41 are integrally connected together, the double gear 37 cannot rotate upon its bearing 39. The stub shafts 36 supporting the bearings 39 are carried by the disc 32 which is rotated at the speed of the casing 17 by the clutch 34. Thus rotation of the casing 17 causes rotation of the gear support or disc 32 which in turn causes rotation of the shaft 11 at the same rotative speed as the shaft 10. In other words, when the clutch members 74 are engaged, the entire mechanism rotates as a body, the driven shaft 11 rotating at the same speed as the drive shaft 10.

If it is desired, an overdrive may be provided. In such a case, it is necessary to drive the driven shaft 11 at a speed greater than that of the drive shaft 10. To accomplish this result, the clutch members 74 remain engaged, the band 69 remains disengaged, and the band 53 is tightened about the drum 50, holding this drum from movement. The sun gear 54 is then held stationary and the pinions or intermediate gears 55 rotate about the gear 54. This causes a rotation of the ring gear 62 in the same direction as the drive shaft. This ring gear 62, is however, already rotating at the rotative speed of the casing 17. This is true because the double gear 37 is locked from rotation with respect to its pivot as the gears 43 and 40 are locked from relative movement through the clutch members 74. As the double gear 37 cannot rotate upon its pivot, the ring gear 46 is rotated at the speed of the casing 17 by the overrunning clutch 34. In other words, the ring gear 46, gear 37, the gear 40, gear 43 and sleeve 42 may be considered a solid mass relatively non-rotatable.

The ring gear 62 must rotate at a greater speed than the casing 17 due to the fact that the gear 54 is held stationary. Thus the rotation of the intermediate gears 55 about the sun gear 54 causes the ring gear 62 and consequently the shaft 11 to which it is locked to rotate at a speed greater than the speed of the shaft 10.

The purpose of the one-way brake 63 has not been described in detail. It will be understood that, with the transmission in the speed corresponding to high gear in the usual motor vehicle, the driven shaft 11 could rotate faster than the drive gear 10 if no means were provided to prevent such action. When in the position known as high gear, the epicyclic gear systems are locked and are rotated by the overruning clutch rollers 34. Accordingly, if the driven shaft 11 were rotated faster than the drive shaft, the clutch rollers 34 would permit the transmission to "free wheel," or coast, the rollers merely sliding back in the slots 35, compressing the light springs in these slots.

In order to prevent this action, the one-way brake 63 is provided between the large diameter bore portion 48 of the hub 47 and the collar 58 secured to the housing 14. This one-way brake prevents the hub 47 from travelling in one direction of rotation. The vehicle therefore cannot free wheel when in any gear.

The clutch unit B mounted upon the shaft 10 may be of any desired shape or type. In the construction illustrated, the clutch includes an operating collar 85 provided with a relatively rotatable band 86 connected at 87 to the clutch operating lever 89. The operating lever 89 may be actuated by the rotation of its pivot shaft 90 by any suitable clutch lever or pedal. Rotation of the shaft 90 causes the collar 85 to be moved to the left as viewed in Figure 1 of the drawings.

Mounted on brackets 91 integral with the collar 85, I secure oppositely disposed hooks 92 which are pivoted to the brackets 91 at 93. Springs 94 encircle the pivots 93 and create a tendency for the hooks 92 to pivot inwardly. Governor weights 95 are mounted upon arms 96 which are pivoted at 97 to the fixed sleeve 99 which does not slide upon the shaft 10. The governor weights 95 are ordinarily held together by means of a spring 100. Rotation of the shaft 10 tends to urge the weights apart causing the clutch B to engage. However, if the weights 95 are drawn together due to slow rotation of the shaft 10, the clutch may be opened by means of the hooks 92.

If the hooks 92 are in retracted position into which they are urged by the springs 94, it is possible for the weights 95 to close into contracted position due to slow rotation of the shaft 10 without opening the clutch. Thus the engine may travel at a low rate of speed without disengaging the clutch. If it is desired to permit the slow speed of the engine to disengage the clutch, however, the clutch pedal may be depressed manually, forcing the collar 85 and the hooks to the left as viewed in Figure 1 of the drawings, these hooks engaging the pins 101 in the hooks 92. Upon release of the clutch pedal, the clutch will assume the position into which it is urged by the weights 95. If the speed of rotation of the shaft 10 is considerable, the weights 95 will be moved outwardly in the position shown in full lines in the drawings and the clutch will remain engaged. If, however, the shaft is travelling at a low rate of speed and the weights are drawn by the spring 100 into the position shown in dotted outline in Figure 1 of the drawings, the clutch 85 will be disengaged.

In order to control the transmission A, I disclose the control mechanism diagrammatically illustrated in Figure 2 of the drawings. This view discloses an operating handle 102 keyed to the shaft 103 by the key 104. On the shaft 103 is mounted a segment 104 having a series of apertures therethrough angularly spaced, but at a common radius from the center of the shaft 103. Each of these openings is closed by means of a transparent disc bearing identifying indicia. The transparent disc 105 is provided with an indicating letter R indicating reverse. The transparent disc 106 is provided with the letters SL standing for super low. The disc 107 bears the letter N designating neutral position. Disc 109 bearing the letter L designates low gear. Discs 110, 111, and 112 respectively, bear the indicia I, H, and Aut., designating intermediate, high, and automatic, respectively. The "automatic" indicator also designates overdrive, as in this position the driven shaft may travel faster than the drive shaft.

The shaft 103 also supports a cam plate 113 having an arcuate shoulder 114. Notches 115 are provided in the periphery of the shoulder 114 and a pawl 116 urged by the spring 117 confined in the casing 119 engages in any of the notches 115 to hold the shaft 103 in selected position. Thus as the shaft 103 is rotated into any selected position, the pawl 116 will engage in one of the notches 115 to hold the shaft in that position.

An illuminating means not disclosed in detail in the drawings is fixed in set position behind one of the discs to illuminate the indicia thereupon. In Figure 2 of the drawings, the disc 107 is shown illuminated to designate that while in that position the transmission is in neutral.

A cam roller 120 engages the shoulder 114 and enters in the cam race 121 between the cam shoulder 122 adjoining the annular shoulder 114 and the outer cam shoulder 123 near the periphery of the cam plate 113. The cam roller 120 is mounted upon a reciprocable shaft 124 which is secured to the valve operating rod 125 secured to the valve 126. A valve 126 is connected by a suitable thrust bearing 127 to the operating rod 129 which may be rotatable with the collar or drum 130. The hub 131 of the collar 130 is connected by a flexible shaft or other suitable means to a worm wheel 132 engaging a worm 133 on the shaft 10. The worm gear and wheel are shown in Figure 1 of the drawings and drive the hub 131, and accordingly the collar 130, at a speed reduced below, but proportional to, the speed of the drive shaft 10.

Within the collar 130 I provide a pair of bell crank levers 134 pivoted to the collar at 135 and bearing weights 136 at one end thereof. The other end of each of these levers 134 is provided with a bearing head 137 which engages between spaced discs or collars 139 on the operating shaft 129. As the speed of rotation of the drive shaft 10 increases the weights 136 are thrown outwardly, raising the operating shaft 129 and valve 126 against the compression of a coil spring 140 bearing against the valve 126. As the speed of rotation of the shaft 10, and accordingly, the governor weights 136 decreases, the spring 140 tends to lower the valve as it is viewed in Figure 2. The collar 130 and its hub 131 together with the weights 136 and their supporting levers 134 are mounted within a casing 141 of suitable design supporting the hub 131 and the drive shaft 129 through the medium of antifriction bearings 142.

The tension of the spring 140 is adjusted by means of a sleeve 143 encircling the shaft 125 which is equipped with a threaded plug 144. The plug 144 screws into and out of the sleeve 143, thus increasing or decreasing the distance between the head 145 of the plug and the end of the sleeve 143. The head 145 of the plug is grooved to accommodate a collar 146 which is pivotally and slidably secured to one arm 147 of a bell crank 149 pivoted at 150 to a stationary bracket 151. The other arm of the bell crank 149 is pivoted at 152 to a rod 153 connected to the accelerator of the motor vehicle. Downward pressure on the vehicle accelerator tends to move the bell crank lever 149 toward the dotted position illustrated in Figure 2, thus increasing the compression of the spring 140. Releasing the pressure on the accelerator tends to similarly decrease the tension on the spring 140.

Suction from the intake manifold of the motor vehicle is introduced through a tubular member 154 to the check valve chamber 155 connected by passage 156 to a vacuum storage tank 157. A check valve 159 tends to retain vacuum within the storage tank and to draw air therefrom. The vacuum storage tank is connected by the passage 160 to the valve compartment in which the valve 126 is located.

The valve 126 within the valve cylinder 161 is provided with spaced piston portions 162, 163, and 164 having portions of reduced diameter therebetween to provide passages for air or vacuum between the various ports of the valve. The suction tube 160 is connected to a port 165 and also to a valve port 166. Air may enter the valve by passing through the intake openings 167, the filtering material 169, and the openings 170. Two air ports 171 and 172 are in communication with the openings 170.

On the opposite side of the valve cylinder 161 I provide two ports 173 and 174. These ports 173 and 174 are connected through the valve 175 to the pipes 176 and 177. When the valve 175 is in the position shown, the pipe 176 is connected with the port 173 while the pipe 177 is connected with the port 174. When the valve 175 is rotated ninety degrees, however, the port 173 is placed into communication with the pipe 177, and the port 174 is in communication with the pipe 176.

The pipeline 176 is connected to an operating diaphragm 179 which actuates a rod 180 pivotally connected at 181 to the brake band 53. The brake band 53 is pivotally connected by the link 182 to the housing 14 of the transmission. A spring 183 encircles the rod 180 and tends to hold the brake band 53 released. When the pipe 176 is connected to air or the outer atmosphere, the brake band 53 remains in the expanded position shown. When suction is introduced into the pipeline 176, however, the diaphragm 179 is pulled outwardly, tightening the band 53 about its drum 50. The pipeline 177 is connected to a diaphragm 184 which operates the rod 185. This rod 185 is pivoted to a cross link 186 which in turn is pivoted to rods 187 and 189. The rod 189 is connected to a brake band 69 in the same manner the rod 180 is connected to the brake band 53. In other words, the end of the rod 189 is merely pivoted as at 181 to the brake band 69. As in the case of the brake band 53, the brake band 69 is ordinarily retained in expanded position.

The rod 187 is connected to or forms a part of the rod 84 which actuates the bifurcated operating arm 81 controlling the clutch members 74. Thus when suction is provided in the pipeline 177, the rod 189 is actuated to tighten the brake band 69 about its drum 67 and simultaneously to disengage the clutch elements 74. As long as suction is provided on the diaphragm 184, the clutch elements 74 remain unlocked.

Upon the shaft 103 I provide a bracket arm 190. This bracket arm 190 is pivoted at 191 to the shaft 192 which actuates the gear rack member 193. This gear rack member slides in a support 194 and is normally urged upwardly by a spring 195. The gear rack member 193 contains a series of teeth 196 which are designed to engage with a gear segment 197 and a second gear segment 199. The bracket 190 is secured through a spring 261 to the shaft 103. For convenience of illustration, I have diagrammatically disclosed the shaft 103 in two different positions of Figure 2, as otherwise all of the mechanism shown at the right of this view would be directly behind the structure shown at the left of the view. I have similarly shown the valve 175 at a point spaced from the valve operating shaft 200 for this valve. It will be understood that in actual practice the shaft 200 upon which the gear segment 197 is secured is in alignment with the valve 175. The gear segment 199 is secured to a shaft 30 and is equipped with a rock lever 29 which has previously been disclosed in Figure 1 of the drawings. This rod 29 actuates the collar 27 to move the pins 23 into and out of the recesses 31 in the gear carrier 32.

In the uppermost position of the rack 193, the teeth 196 engage the teeth of the pinion segment 197. Thus downward movement of the rack 193 causes the segment 197 to be rotated through a ninety degree angle until the teeth on the segment are pivoted out of engagement with the teeth 196 and the smooth surface 201 of the segment 197 engages the surface of the rack 193 and slides along the same. Further downward movement of the rack 193 causes the teeth 196 to be brought into engagement with the teeth of the gear segment 199 causing rotation of the shaft 30. Downward movement of the rack 193 causes the flat surface 202 of the segment 199 to slide along the surface of the rack 193 until the teeth move into engagement, rotating shaft 30. Thus upon downward movement of the rack 193, the shaft 200 of the valve 175 is first rotated through ninety degrees and later the arm or rock lever 29 is pivoted to move the pins 23 into engagement with the apertures 31 in the gear carrier 32.

A cam 203 is also mounted upon the shaft 103 and is designed to engage a roller 204 mounted upon the arm 205 which is pivoted to a fixed pivot at the point 206. The other end of the arm 205 is pivotally connected at 207 to a link rod 209 which is pivotally connected to a cam latch 211 at 210. The cam latch 211 is pivoted from the position illustrated in full lines in Figure 2 of the drawings to the position illustrated in dotted outline therein, and normally is in the position illustrated in dotted outline. However, a notch 212 is formed in the cam 203 engageable with the roller 204 in the neutral position of the cam 203 illustrated, and in this one position the cam latch 211 is pivoted into the path of a projection 213 on the shaft 90 of the clutch operating yoke or lever 89.

From this description it will be obvious that in the neutral position shown in Figure 2, the latch 211 is pivoted into the path of the projection 213, preventing the clutch from being moved into engaging position. Thus even though the motor is running and the transmission is in set position to cause rotation of the drive shaft, the clutch remains in disengaged position until the operating hand lever 102 pivots the shaft 103 into some operating position in which the notch 212 is disengaged from the roller 204. Rotation of the cam 203 in either direction will cause the roller 204 to be pivoted downwardly, forcing the link 209 downwardly and raising the latch 211 into the dotted position shown in Figure 2.

A latch 214 is pivoted at 215 and is movable into and out of engagement with a catch 216 on the operating rod 187. When this latch 214 is in the position indicated in Figure 2 of the drawings, the rod 187 and consequently the rod 84 cannot move to the right, and therefore the clutch members 74 cannot be engaged. However, the latch 214 may be raised by the operating rod 217 which is provided with a hook end 219 engageable over the bracket arm 190. The raising of the bracket arm 190 into the position shown in dotted outline in Figure 2 draws the operating rod 217 upwardly pivoting the latch 214 upwardly out of engagement with the catch 216. The latch 214 is shown in its lowest extreme position in Figure 2 and further lowering of the arm 190 upon the shaft 103 cannot move this link 217 downwardly as the hook end 219 of the link merely rests upon the top of the bracket arm 190.

In order to provide a visual indication on the dashboard of the vehicle designating which speed ratio is being used, I provide indicator bulbs on the dashboard, each of which may be illuminated through a separate circuit, designating one of the speed ratios at which my transmission may be set. The indicator 220 designates reverse and is connected by a wire 221 to a contact 222 on the cam plate 113. This contact is engaged by the cooperating contact arm 223 movable with the shaft 103 when the lever 102 is rotated into the position in which the transparent disc 105 is illuminated. This contact 223 is grounded in the manner illustrated. All of the various indicator lights are connected by the common wire 224 to the battery 225, the opposite terminal 226 of which is grounded.

The indicator 227 is connected by the wire 229 to the contact 230 on the cam disc 113 which is cooperable with the contact arm 223 in one position of the operating lever 102. The indicator 227 is connected to the common wire 224, thus closing the circuit when the contact 223 is in engagement therewith. This contact 227 indicates super low gear.

The indicator 231 provides an indication when the gears are in neutral position, and this indicator is connected by the wire 232 to a contact 233 engageable with the contact arm 223 to close the circuit. The low gear indicator 234 is connected by the wire 235 to a contact 236 on the cam plate 113. Thus the circuit to this indicator may be closed by contact arm 223.

The intermediate gear indicator 237 is connected by the conductor wire 239 to the contact 240 which is cooperable with the arm 241 causing contact to be made between the contact 240 and the cooperating contact 242 which is grounded at 243. The high gear indicator 244 is connected by the wire 245 to a contact 246 which may be connected to its cooperable grounded contact 247 through the arm 241. Similarly the overdrive indicator 249 is connected by the conductor 250 to its contact 251 which may be electrically connected to its ground contact 252 by the arm 241. The arm 241 is pivotally mounted at 253 and is provided with gear teeth 254 engaging cooperating gear teeth on the rod 124. Vertical movement of the rod 124 by the cam race or by the governor pivots the arm 241 and provides a visual indication of the gear in which the transmission A is functioning.

When the lever 102 has been moved to automatic position, a grounded contact 255 on the cam plate 113 engages a cooperating contact 256 mounted adjacent the cam plate in communication with one of a pair of spaced contacts 257 and 259 the other contact of which is connected to the conductor 235. When the contacts 259 and 257 are electrically connected by the arm 241, the low gear indicator 234 is displayed.

The purpose of the arm 241 is to provide a visual indication of the speed in which the transmission is functioning when the transmission is set in automatic position. When set in this position, the roller 120 is free to move between wide limits and the valve 126 is controlled entirely by the spring 140 and the governor arms 129. Thus as the valve 126 is moved by the governors, the transmission may be moved from overdrive to low gear automatically, and the arm 241 provides a means of closing circuits to indicating bulbs which disclose which of the possible gear ratios the transmission has assumed.

In the operation of my transmission, let it be assumed that a reverse drive of shaft 11 is desired. In order to function in reverse, it is necessary that air under atmospheric pressure be introduced into the diaphragm 184, that the diaphragm 179 be connected to vacuum supply, and that the pins 23 be engaged in the apertures 31 in the gear carriers 32. In order to accomplish this result, the operating lever 102 is pivoted in a counter-clockwise direction, rotating the shaft 103, thus lowering the bracket arm 190 to its lowest extreme position. The teeth 196 pivot the segment 197, rotating the valve 175 to a position at right angles from the position shown, and further downward movement of the rack 193 pivots the segment 199 to swing the rock lever 29 in a clockwise direction forcing the pins 23 into the apertures 31. In this position it will be found that the vacuum tank 157 is communicating through the pipe 160 and the port 166 through the valve 175 to the port 174 which is communicating with the pipeline 176, leading to the diaphragm 179. Thus the diaphragm 179 is subjected to vacuum, moving the rod 180 to the left, and tightening the band 53 about the drum 50. Simultaneously, the port 171 is in communication with the port 173 which communicates through the valve 175 to the pipeline 177 connected to the diaphragm 184. Thus the diaphragm 184 is open to atmospheric pressure, the diaphragm is collapsed, and the spring expands the brake drum 69 causing this band to be loose upon its drum 67. At this time, however, the latch 214 is in engagement with its cooperating catch 216, preventing the rod 84 from moving to the right to release the clutch elements 74. Thus during this movement the clutch elements 74 remain disengaged.

In order to move the transmission into super low position, the control lever 102 is moved slightly in a clockwise direction, shifting the bracket 190 upwardly, thus moving the rack 193 upwardly. In reverse position the teeth of the segment 199 have been engaged with the teeth 196 and upward movement of the rack tends to pivot the lever 29 in a counter-clockwise direction into the position shown in Figure 2, thus disengaging the pins 23 from the apertures 31 in the gear carrier 32. The rack 193 is not moved sufficiently to engage and pivot the segment 197. During this time the roller 120 of the lever 124 has been travelling upon the arcuated portion 114 of the cam plate 113, and thus the setting of the valve 126 has not been changed. Accordingly, in super low position, the vacuum in the tank 157 is connected through the valve 175 with the diaphragm 179, while the air pressure entering through the openings 167 communicates through the valve 175 and the pipeline 177 to the diaphragm 184. The band 69 remains loose about its drum 67, the clutch elements 74 remain disengaged through the action of the latch 214, the band 53 remains taut about its drum 50, and the pins 23 are removed from the gear support 32.

In neutral position the control lever 102 is moved slightly in a clockwise direction, raising the bracket 190, and accordingly the rack 193. This upward movement of the rack 193 brings the teeth 196 into engagement with the segment 197, pivoting the valve shaft 200 ninety degrees and changing the position of the valve 175 into the position illustrated. In this neutral position, however, the notch 212 engages the roller 204, pivoting the latch 211 into the position shown in full lines in Figure 2. Thus the clutch B cannot function in this position, and the transmission is not actuated.

In order to place the transmission in low gear, the control handle 102 is further pivoted in a clockwise direction. The valve 162 and the valves 175 are then in the position disclosed in Figure 2 of the drawings. In this position vacuum from the tank 157 is communicated through the pipe 160, port 166, port 174, valve 175, and pipe 177 to the diaphragm 184, causing the cross connecting member 186 to be drawn to the left, tightening the band 69 about its drum 67, and maintaining the clutch elements 74 disengaged. Simultaneously the port 171 which is in communication with atmospheric pressure is connected to the port 173 which in turn is connected through the valve 175 and the pipeline 176 to the diaphragm 179. Thus the spring 183 loosens the band 53 about the brake drum 50.

Once neutral position has been assumed, the bracket 190 no longer pivots upwardly. This bracket 190 strikes a stop pin 260. The bracket 190 is secured to the shaft 103 by means of a spring 261, thus allowing further rotation of the shaft 103 without further upward movement of the bracket 190. Thus while the control lever 102 moves the shaft 103 into low, intermediate, high, and automatic positions, the bracket 190 remains stationary.

When it is desired to place the transmission in the gear ratio commonly known as intermediate, the control lever 102 is rotated in a clockwise direction, the roller 120 entering the cam race 121 and being moved upwardly a short distance thereby. When in this position, vacuum in the tank 157 is transmitted from the pipeline 160, port 165, the reduced diameter portion between the piston members 163 and 164 of the valve 126, the port 173, valve 175, and pipeline 176 to the diaphragm 179. Similarly, the vacuum is transmitted through the pipe 160 and port 166, the port 174, valve 175, and pipeline 177 to the diaphragm 184. Thus the band 53 encircling the brake drum 50 is tightened, the band 69 encircling the brake drum 67 is tightened, and the clutch members 74 are held in disengagement. When in this position, the driven shaft will be rotated at a somewhat less speed than the drive shaft, but at a higher rate of speed than when the transmission is set in low gear.

When it is desired to place the transmission in high gear, the operating lever 102 is moved to a greater extent, the roller 120 being raised by the cam race 121. When in this position, the vacuum port 165 is closed by the piston 163 and the air port 171 is connected to the port 173, thus permitting atmospheric pressure to enter the pipe 176 and accordingly release the vacuum in the diaphragm 179. The spring 183 thereupon loosens the brake band 53 about its drum 50. Simultaneously, the piston 162 uncovers the air port 172, permitting atmospheric pressure to be transmitted to the port 174 in communication through the valve 175 with the pipeline 177. Thus the vacuum within the diaphragm 184 is released, loosening the brake band 69 about its drum 67 and permitting the clutch elements 74 to engage. When in this position, the driven shaft rotates in unison with the drive shaft.

When it is desired to set the transmission in overdrive or automatic drive, the control handle 102 is rotated to its extreme position in a clockwise direction, and the roller 120 is permitted to raise to a greater extent. This further movement causes the piston 163 to raise above the ports 165 and 173, closing off the air port 171, and introducing vacuum from the tank 157 through the pipe 160, port 165, the space in the valve 126 between the pistons 162 and 163, through the port 173, the valve 175, and the pipeline 176 to the diaphragm 179. This action tightens the band 53 about its drum 50. At the same time, however, the lower extremity of the valve 126 closes off the vacuum port 166 and maintains the air port 172 in communication with the port 174 which communicates through the valve 175 and the pipeline 177 to the diaphragm 184. Thus the band 69 remains loose upon its drum and the clutch elements 74 remain engaged.

In the foregoing description I have explained the manner in which my transmission is constructed and the relationship between the various brake bands and clutches when the transmission is set to deliver various relative speeds. The clutch elements 74, the brake bands 53 and 69, and the pins 23 are movable into or out of operable position, and various combinations of positions provide the various relative speeds. The manner in which these relative positions of the clutch elements 74, brake bands 53 and 69, and the pins 23 may be attained has also been pointed out in detail. It is obvious that when the control lever 102 is set for automatic ratio, the gear ratio between the drive and driven shafts is dependent upon the speed of rotation of the drive shaft and the position of the accelerator, as the governors control the position of the valve 126 which controls the setting of the transmission A.

In accordance with the patent statutes, I have described the principles of construction and operation of my transmission; and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. In a transmission, a drive shaft, a driven shaft coaxial with said drive shaft, a pair of relatively rotatable sun gears rotatably mounted on said driven shaft, a planet gear carrier secured for rotation with said drive shaft, planet gears rotatably supported by said planet gear carrier engageable with one of said sun gears, a second planet gear carrier relatively rotatable with respect to said shafts, second planet gears of different diameter from said first named planet gears on said second carrier engageable with the second of said sun gears, a first and second ring gear of unequal diameter connected for rotation in unison, means for holding said second sun gear stationary, pinions secured to said second planet gears for rotation therewith, gear means on said driven shaft engaging said pinions, and means connecting said second planet gear carrier to said drive shaft for rotating said gear carrier therewith.

2. In a transmission, a drive shaft, a driven shaft coaxial therewith, a sun gear rotatable relative to said shafts and coaxial therewith, a rotatable planet gear carrier, overrunning clutch means connecting said drive shaft to said gear carrier to drive said carrier with said drive shaft, planet gear means on said carrier engageable with said sun gear, pinion means coaxial with, and rotatable in unison with, said planet gear means, gear means on said driven shaft engaging said pinion means, and means for selectively holding said sun gear stationary.

3. In a transmission, a drive shaft, a driven shaft coaxial therewith, a pair of epicyclic gear systems connecting said shafts comprising a pair of relatively rotatable sun gears coaxial with, and rotatable with respect to, said shafts, a pair of rotatable planet gear carriers, means connecting said carriers to rotate in unison, planet gear means on one of said carriers engaging one of said sun gears, second planet gears on the other of said carriers engaging the other of said sun gears, ring gears of relatively different diameters connected together and engaging said first and second planet gear means, pinion means coaxial and rotatable together with said planet gear means, gear means on said driven shaft engageable with said pinion means, and means for holding said first sun gear stationary.

4. In a transmission, a drive shaft, a driven shaft coaxial therewith, a pair of epicyclic gear systems connecting said shafts comprising a pair of relatively rotatable sun gears coaxial with, and rotatable with respect to, said shafts, a pair of rotatable planet gear carriers, means connecting said carriers to rotate in unison, planet gear means on one of said carriers engaging one of said sun gears, second planet gears on the other of said carriers engaging the other of said sun gears, ring gears of relatively different diameters connected together and engaging said first and second planet gear means, means operatively connecting said second planet gears to said driven shaft to rotate said driven shaft, and means for holding said first sun gear stationary.

5. In a transmission, a drive shaft, a coaxial driven shaft, a pair of relatively rotatable sun gears rotatable with respect to and coaxial with said shafts, planet gear means engaging one of said sun gears, a ring gear engaging said planet gear means, a planet gear support, means connecting said support to said drive shaft to rotate therewith, second planet gears relatively larger than said first named planet gears engaging the other said sun gear, a second ring gear relatively larger than said first named ring gear engaging said second planet gears, said ring gears connected to rotate in unison, a second planet gear support, disengageable means connecting said second support to said drive shaft to rotate therewith, and gear means operatively connecting said second planet gears to said driven shaft to rotate the same.

6. In a transmission, a drive shaft, a coaxial driven shaft, a pair of relatively rotatable sun gears rotatable with respect to, and coaxial with, said shafts, planet gear means engaging one of said sun gears, planet gear supporting means connected to, and rotatable together with, said drive shaft, ring gear means engaging said planet gear means coaxial with, and rotatable with respect to, said drive shaft, a second ring gear secured to, and rotatable with, said first named ring gear, second planet gear means interposed between and engaging said second ring gear and the other said sun gear, a second planet gear support relatively rotatable with respect to said shafts, overrunning clutch means between said drive shaft and said second gear support to rotate said second support at least as fast as said drive shaft but holding said second support free to rotate faster than said drive shaft, and cooperable gear means operatively connecting said second planet gears and said driven shaft.

7. In a transmission, a drive shaft, a coaxial driven shaft, a pair of relatively rotatable sun gears coaxial with, and rotatable with respect to, said shafts, planet gear means engaging one of said sun gears, a ring gear engaging said planet gear means rotatable upon, and coaxial with, said shafts, a planet gear support, means connecting said support to said drive shaft to rotate therewith, a second ring gear larger in diameter than said first named ring gear connected thereto and coaxial with said shafts, second planet gear means between and connecting said second ring gear and the other said sun gear, pinion means concentric and rotatable in unison with said second planet gear means, a gear on said driven shaft meshing with said pinion means, a second planet gear support for said second planet gear means, overrunning clutch means between said second gear support and said drive shaft, and selective means for holding both said ring gears stationary.

8. In a transmission, a drive shaft, a coaxial driven shaft, a pair of relatively rotatable sun gears rotatable with respect to, and coaxial with, said shafts, planet gear means engaging one of said sun gears, a first planet gear support secured to said drive shaft to rotate therewith, a first ring gear concentric with said shaft engaging said planet gear means, a second ring gear secured to said first ring gear, a second planet gear means interposed between, and meshing with, said second ring gear and the other of said sun gears, a second gear support for said second planet gear means, an overrunning clutch between said second gear support and said drive shaft to rotate said second gear support in unison with said drive shaft, pinion means coaxial with, and rotatable with, said second planet gear means, a gear on said driven shaft in mesh with said pinion means, and clutch means selectively engaging said other sun gear and said driven shaft, to rotate said other sun gear together with said shaft.

9. In a transmission, a drive shaft, a coaxial driven shaft, pair of relatively rotatable sun gears coaxial with, and rotatable with respect to, said shafts, a double ring gear rotatable with respect to said shafts, said double ring gear comprising a first and second ring gear connected for rotation together, a first planet gear means between, and meshing with, one of said sun gears and said first ring gear, a second planet gear means between, and meshing with, the other of said sun gears and said second ring gear, a first planet gear supporting means connected to, and rotating with, said drive shaft, a second planet gear supporting means, an overrunning clutch interposed between said second supporting means and said drive shaft to drive said supporting means at least as fast as said drive shaft, and free to rotate faster, pinion means concentric and rotatable with said second planet gear means, gear means on said driven shaft engaging said pinion means, means for locking said one sun gear stationary, and clutch means selectively locking said other sun gear from rotation relative to said driven shaft.

10. In a transmission, a drive shaft, a coaxial driven shaft, a pair of relatively rotatable sun gears rotatable with respect to, and coaxial with, said shafts, planet gear means engaging one of said sun gears, planet gear supporting means connected to, and rotatable together with, said drive shaft, ring gear means engaging said planet gear means coaxial with, and rotatable with respect to, said shaft, a second ring gear secured to, and rotatable with, said first ring gear, a second planet gear means interposed between and engaging said second ring gear and the other of said sun gears, a second planet gear support rotatable relative to said shafts, overrunning clutch means between said drive shaft and said second planet gear support to drive said second support at a speed equal to or greater than said drive shaft, brake means secured for rotation with each of said sun gears, means cooperable with said brake means to selectively hold either of said sun gears from rotation, pinion means concentric with and rotatable with said second planet gear means, and gear means on said driven shaft engaging said pinion means.

11. In a transmission, a drive shaft, a coaxial driven shaft, a pair of relatively rotatable sun gears coaxial with, and rotatable with respect to, said shafts, a double ring gear comprising a first and second ring gear connected for rotation together, a first planet gear means between and meshing with one of said sun gears and said first ring gear, a second planet gear means between and meshing with the other of said sun gears and said second ring gear, a first planet gear supporting means connected to, and rotating with, said drive shaft, a second planet gear supporting means and overrunning clutch between said drive shaft and said second supporting means to drive said supporting means as fast or faster than said drive shaft, brake means secured to each of said sun gears, means independently and selectively cooperable with each of said brake means to hold either of said sun gears from rotation, means selectively operable for securing one of said sun gears to said driven shaft for rotation in unison therewith, pinion means concentric with and rotatable with said second planet gear means, and gear means on said driven shaft engaging said pinion means.

12. In a transmission, a drive shaft, a driven shaft coaxial with, and rotatable with respect to, said shafts, a pair of relatively rotatable sun gears coaxial with and rotatable with respect to, said shafts, a double ring gear rotatable with respect to said shafts, said double ring gear comprising a first and second ring gear connected for rotation together, a first planet gear means between and meshing with one of said sun gears and said first ring gear, a second planet gear means between and meshing with the other of said sun gears and said second ring gear, a first planet gear supporting means connected to and rotating with said drive shaft, a second planet gear supporting means, pinion means concentric and rotatable with said second planet gear means, gear means on said driven shaft engaging said pinion means, brake means connected to each of said sun gears, means cooperable with said brake means to stop either of said sun gears from rotation, clutch means interposed between said driven shaft and one of said sun gears to cause rotation of said one sun gear together with said driven shaft, and means selectively connecting said second planet gear support to said drive shaft to cause rotation of said second planet gear support in unison with said drive shaft.

13. In a transmission, a drive shaft, a driven shaft, a pair of relatively rotatable sun gears coaxial with said driven shaft, a planet gear carrier coaxial with said driven shaft, means operatively connecting said drive shaft to said gear carrier to rotate the same, planet gear means rotatably supported by said planet gear carrier engageable with one of said sun gears, a second planet gear carrier, means operatively connecting said second gear carrier to said drive shaft to rotate said second gear carrier, second planet gear means on said second carrier engageable with the second of said sun gears, a first and second ring gear connected for rotation in unison, pinion means secured to said second planet gear means for rotation therewith, and gear means on said driven shaft engaging said pinion means.

14. In a transmission, a drive shaft, a driven shaft, a pair of relatively rotatable sun gears coaxial with said driven shaft, a planet gear carrier coaxial with said driven shaft, means operatively connecting said drive shaft to said gear carrier to rotate the same, a first planet gear means rotatably supported by said planet gear carrier engageable with one of said sun gears, a second planet gear carrier, means operatively connecting said second gear carrier to said drive shaft to rotate said second gear carrier, second planet gear means on said second carrier engageable with the second of said sun gears, a first and second ring gear connected for rotation in unison and engaging said first and second planet gear means, and cooperable means operatively connecting said second planet gear means and said driven shaft.

15. In a transmission, a drive shaft, a driven shaft, a pair of relatively rotatable sun gears coaxial with said driven shaft, a planet gear carrier coaxial with said driven shaft, means operatively connecting said drive shaft to said gear carrier to rotate the same, a first planet gear means rotatably supported by said planet gear carrier engageable with one of said sun gears, a second planet gear carrier, means operatively connecting said second gear carrier to said drive shaft to rotate said second gear carrier, second planet gear means on said second carrier engageable with the second of said sun gears, a first and second ring gear connected for rotation in unison and engaging said first and second planet gear means, cooperable means operatively connecting said second planet gear means and said driven shaft, and means selectively operable for holding either of said sun gears from rotation.

ALBERT L. JOHNSON.